United States Patent
Nobata

(10) Patent No.: US 10,930,939 B2
(45) Date of Patent: Feb. 23, 2021

(54) MANUFACTURING METHOD FOR FUEL CELL SEPARATOR

(71) Applicant: TOYOTA JIDOSHA KABUSHIKI KAISHA, Toyota (JP)

(72) Inventor: Yasuhiro Nobata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 148 days.

(21) Appl. No.: 16/135,661

(22) Filed: Sep. 19, 2018

(65) Prior Publication Data

US 2019/0097197 A1 Mar. 28, 2019

(30) Foreign Application Priority Data

Sep. 22, 2017 (JP) .............................. JP2017-182252

(51) Int. Cl.
| | |
|---|---|
| *H01M 8/0206* | (2016.01) |
| *H01M 8/0221* | (2016.01) |
| *H01M 8/0228* | (2016.01) |
| *H01M 8/0258* | (2016.01) |

(52) U.S. Cl.
CPC ....... *H01M 8/0206* (2013.01); *H01M 8/0221* (2013.01); *H01M 8/0228* (2013.01); *H01M 8/0258* (2013.01)

(58) Field of Classification Search
CPC ............. H01M 8/0206; H01M 8/0221; H01M 8/0228; H01M 8/0258
USPC .......................................................... 429/514
See application file for complete search history.

(56) References Cited

U.S. PATENT DOCUMENTS

| | | | |
|---|---|---|---|
| 2009/0197140 A1* | 8/2009 | Jiang ........................ | B32B 3/30 429/437 |
| 2015/0140204 A1* | 5/2015 | Suzuki ................ | H01M 8/0254 427/115 |
| 2015/0263357 A1* | 9/2015 | Morozumi ............ | H01M 8/021 429/514 |

FOREIGN PATENT DOCUMENTS

| | | | | |
|---|---|---|---|---|
| GB | 2288145 A | * | 10/1995 | ............. B29C 33/10 |
| JP | 2005-317388 | | 11/2005 | |
| JP | 2007-324146 | | 12/2007 | |

OTHER PUBLICATIONS

Hoogers, Gregor, Fuel Cell Technology Handbook, 2003, CRC Press, 2-16-2-20 (Year: 2003).*

* cited by examiner

*Primary Examiner* — Sean P Cullen
(74) *Attorney, Agent, or Firm* — Finnegan, Henderson, Farabow, Garrett & Dunner, LLP

(57) ABSTRACT

A manufacturing method for a fuel cell separator includes preparing a separator member in which an uncured thermosetting resin layer is provided on a surface of a core member, as a preparation step; and pressing the separator member while heating the separator member so that a gas flow passage is formed in the separator member while the uncured thermosetting resin layer is cured, as a hot-press step.

5 Claims, 3 Drawing Sheets

MANUFACTURING METHOD FOR FUEL CELL SEPARATOR

INCORPORATION BY REFERENCE

The disclosure of Japanese Patent Application No. 2017-182252 filed on Sep. 22, 2017 including the specification, drawings and abstract is incorporated herein by reference in its entirety.

BACKGROUND

1. Technical Field

The disclosure relates to a manufacturing method for a fuel cell separator in which a coat layer containing thermosetting resin is formed on a surface of a core member.

2. Description of Related Art

In a fuel cell (also sometimes referred to as a fuel cell stack), a single cell (also referred to as a cell of a fuel cell) is made by sandwiching an electrolyte film between an anode and a cathode, and the fuel cell is made by stacking (laminating) the plurality of single cells through separators, respectively.

For example, each cell of a fuel cell in a polymer electrolyte fuel cell includes a membrane electrode assembly (MEA) that is made of an ion permeable electrolyte film, and an anode-side catalyst layer (an electrode layer) and a cathode-side catalyst layer (an electrode layer) that sandwich the electrolyte film. Gas diffusion layers (GDLs) are formed on both sides of the MEA in order to supply fuel gas or oxidant gas and also collect electricity generated by electrochemical reaction. The membrane electrode assembly with the GDLs disposed on both sides thereof is referred to as a membrane electrode & gas diffusion layer assembly (MEGA), and the MEGA is sandwiched by a pair of separators. The MEGA is a power generation part of the fuel cell, and, when the gas diffusion layers are not provided, the MEA serves as a power generation part of the fuel cell.

In each of the fuel cell separators, a coat layer is normally provided on its surface in order to reduce surface electric resistance (ensure conductivity), to ensure corrosion resistance, and so on. At the same time, the separator is pressed into a wave shape or an uneven shape in a sectional view so that grooves (gas flow passages) serving as flow passages for gas (hydrogen, oxygen, and so on) are formed.

As a manufacturing method for the fuel cell separator, for example, a method is known in which a conductive resin layer containing a mixture of resin and a conductive filler is formed on a metal substrate serving as a core member, and then projecting portions and groove portions are formed by pressing in order to form gas flow passages (for example, see Japanese Unexamined Patent Application Publication No. 2007-324146 (JP 2007-324146 A) below). Also, a method is known in which conductive slurry is laminated on a surface of a metal plate serving as a core member, a molded layer provided with gas flow passages is formed in the conductive slurry by a stamper, and then the molded layer is cured so as to form a resin layer (for example, see Japanese Unexamined Patent Application Publication No. 2005-317388 (JP 2005-317388 A) below).

SUMMARY

However, in the manufacturing methods according to the related arts described in JP 2007-324146 A and JP 2005-317388 A, forming of the resin layer on the core member and forming of the gas flow passages are carried out in separate steps. This causes a problem that manufacturing time becomes longer, and productivity is thus reduced.

The disclosure provides a manufacturing method for a fuel cell separator by which productivity of the fuel cell separator is improved effectively.

An aspect of the disclosure relates to a manufacturing method for a fuel cell separator in which a coat layer made of a thermosetting resin layer is formed, and a gas flow passage is provided. The manufacturing method for the fuel cell separator includes preparing a separator member in which an uncured thermosetting resin layer is provided on a surface of a core member, as a preparation step; and pressing the separator member while heating the separator member so that the gas flow passage is formed in the separator member while the uncured thermosetting resin layer is cured, as a hot-press step.

A release portion may be provided in a die that is used for the hot-press step. In the hot-press step, the uncured thermosetting resin layer may be cured and the gas flow passage may be formed in the separator member while uncured thermosetting resin is allowed to flow in the release portion.

Further, the core member may be made from titanium or SUS, and heating temperature for the hot-press step may be within a range between 180° C. and 210° C.

Also, a thickness of the uncured thermosetting resin layer may be larger than a thickness of the core member in the separator member.

Furthermore, the thickness of the core member may be within a range between 40 μm and 70 μm, and a total sum of thicknesses of the uncured thermosetting resin layers formed on both surfaces of the core member may be within a range between 50 μm and 300 μm.

According to the disclosure, the coat layer (the thermosetting resin layer) of the separator member is cured and the gas flow passage is formed at the same time. Therefore, time (steps) required for manufacturing is reduced, thereby improving productivity of the fuel cell separator effectively.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
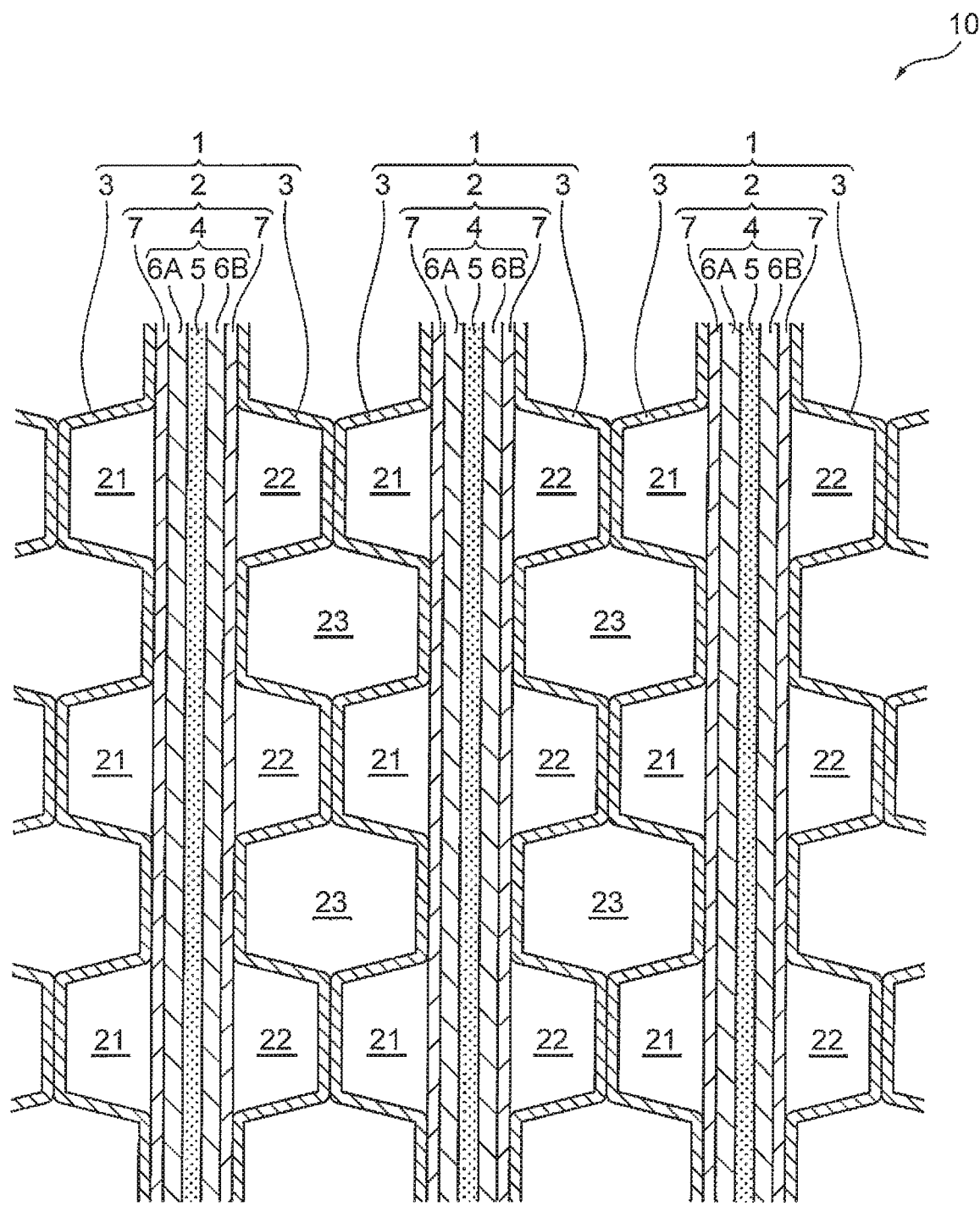
FIG. 1 is a sectional view of a main part of a fuel cell stack provided with separators.

Hereinafter, a constitution of the disclosure is described in detail based on an example of an embodiment shown in the drawings. As an example, a case is described below in which the disclosure is applied to a fuel cell installed in a fuel cell vehicle, or to a fuel cell system including the fuel cell. However, a scope of the application is not limited to this example.

Structure of Fuel Cell Stack Including Separators

FIG. 1 is a sectional view of a main part of a fuel cell stack 10. As shown in FIG. 1, a plurality of single cells 1, each of which serves as a base unit, is laminated in the fuel cell stack 10. Each of the single cells 1 is a polymer electrolyte fuel cell that generates electromotive force by electrochemical reaction between oxidant gas (for example, air) and fuel gas (for example, hydrogen). The single cell 1 is provided with an MEGA 2, and a pair of separators (fuel cell separators) 3 that is in contact with the MEGA 2 so as to partition the MEGA 2. In the embodiment, the MEGA 2 is sandwiched between the separators 3.

The MEGA 2 is made by integrating a membrane electrode assembly (MEA) 4, and gas diffusion layers 7 that are disposed on both surfaces of the membrane electrode assembly 4. The membrane electrode assembly 4 includes an electrolyte film 5, and a pair of electrodes 6A, 6B joined to the electrolyte film 5 so as to sandwich the electrolyte film 5. The electrolyte film 5 is made of an ion exchange membrane with proton conductivity formed from a solid polymeric material, and the electrodes 6A, 6B are formed from, for example, a porous carbonaceous material that supports a catalyst such as platinum. The electrode 6A disposed on one side of the electrolyte film 5 serves as an anode, and the electrode 6B on the other side serves as a cathode. Each of the gas diffusion layers 7 is made of a porous carbon body such as carbon paper or carbon cloth, or a conductive member with gas permeability such as metal mesh and foamed metal.

In the embodiment, the MEGA 2 serves as a power generation part of the single cell 1, and the separators 3 are in contact with the gas diffusion layers 7 of the MEGA 2, respectively. Further, when the gas diffusion layers 7 are omitted, the membrane electrode assembly 4 serves as a power generation part, and, in this case, the separators 3 are in contact with the membrane electrode assembly 4. Therefore, the power generation part of the single cell 1 includes the membrane electrode assembly 4 and is in contact with the separators 3.

Each of the separators 3 is a plate-shaped member. A core member (a base material) of the separator 3 is metal (for example, metal such as SUS, titanium, aluminum, copper, and nickel) that is excellent in conductivity and gas impermeability. A first surface side of the separator 3 comes into contact with the gas diffusion layer 7 of the MEGA 2, and a second surface side of the separator 3 comes in to contact with a second surface side of the neighboring separator 3.

Figure 2:
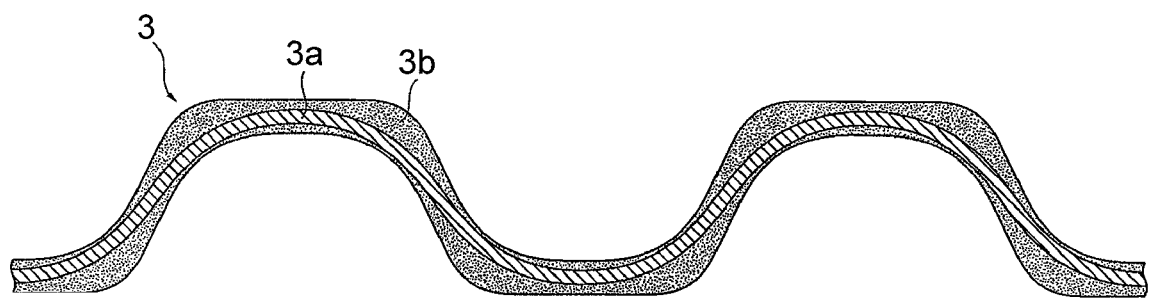
FIG. 2 is an enlarged sectional view of a main part of an inside structure of the separator.

In the embodiment, as shown in an enlarged view in FIG. 2, coat layers 3b are formed on the first surface side and the second surface side of (the core member 3a of) each of the separators 3 (the surface coming into contact with the gas diffusion layer 7 of the MEGA 2, and the surface coming into contact with the second surface side of the neighboring separator 3), respectively. Each of the coat layers 3b is formed as a conductive film that is made of a thermosetting resin layer in which carbon powder (powdery carbon) is kneaded in thermosetting resin. In order to ensure adhesion and so on, an intermediate layer (not shown) may be provided between the core member 3a and the coat layer 3b that structure the separator 3.

The coat layer 3b only needs to have conductivity, corrosion resistance, and so on, and the thermosetting resin that forms the coat layer 3b may be phenol resin, urea resin, melamine resin, unsaturated polyester resin, epoxy resin and so on. A thickness of the coat layer 3b is not particularly limited, but may be, for example, between about 0.01 mm and 0.2 mm, or, more broadly, between about 0.01 mm and 0.3 mm. Further, a thickness (a plate thickness) of the core member 3a that structures the separator 3 is not particularly limited. However, strength is ensured within a range between, for example, 40 μm and 70 μm. When strength is not sufficient with the core member 3a only, the thickness of the coat layer 3b may be increased, and the core member 3a and the coat layer 3b serving as a resin layer may be laminated without any clearance between the core member 3a and the coat layer 3b. Thus, necessary strength is ensured.

In the embodiment, (a sectional shape of) each of the separators 3 is formed into a wave shape or an uneven shape. In the shape of the separator 3, the wave shape forms an isosceles trapezoid, a vertex of the wave is almost flat, and both ends of the vertex have angular shapes at an equal angle. This means that each of the separators 3 has almost the same shape when seen from both front and back sides. The vertex of the separator 3 is in surface contact with the first gas diffusion layer 7 of the MEGA 2, and the vertex of the separator 3 is in surface contact with the second gas diffusion layer 7 of the MEGA 2.

The separator 3 is made as follows. Slurry (an uncured thermosetting resin layer) in a paste form made by kneading carbon powder in thermosetting resin is applied to surfaces (both surfaces) of the core member 3a and dried, thus forming a separator member 3c (see FIG. 4). The separator member 3c is pressed by a die while being heated, thereby curing the uncured thermosetting resin layer. The coat layers 3b are thus formed on the surfaces of the core member 3a, respectively, and the foregoing shape is formed (plastic deformation happens) (described later in detail).

Gas flow passages 21 defined between the gas diffusion layer 7 on the first electrode (the anode) 6A side and the separator 3 are flow passages where fuel gas flows. Gas flow passages 22 defined between the gas diffusion layer 7 on the second electrode (the cathode) 6B side and the separator 3 are flow passages where oxidant gas flows. Out of the gas flow passages 21 and the gas flow passages 22 that face each other through single cell 1, fuel gas is supplied to the gas flow passages 21, and oxidant gas is supplied to the gas flow passages 22. Thus, electrochemical reaction happens in the single cell 1, generating electromotive force.

Further, one of the single cells 1 and another neighboring single cell 1 are disposed so that the electrode 6A serving as the anode and the electrode 6B serving as the cathode face each other. The vertex of the separator 3 on a back surface side, the separator 3 being disposed along the electrode 6A serving as the anode of one of the single cells 1, and the vertex of the separator 3 on a back surface side, the separator 3 being disposed along the electrode 6B serving as the cathode of another single cell 1 are in surface contact with each other. There is space 23 defined between the separators 3 that are in surface contact between the neighboring two single cells 1. In the space 23, water serving as a coolant for cooling the single cells 1 flows.

Manufacturing Steps for Separator

Figure 3:
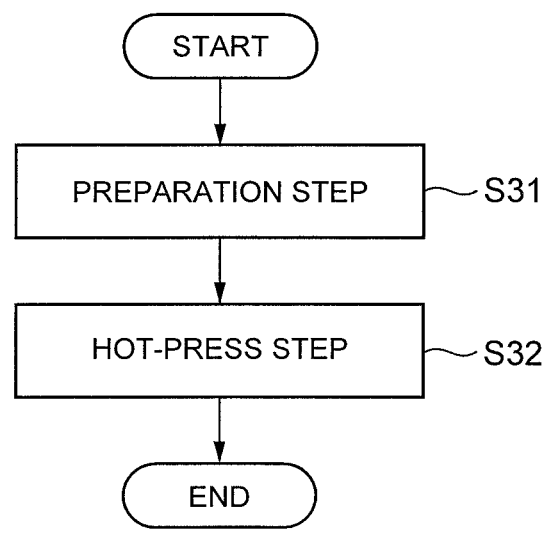
FIG. 3 is a flowchart showing an outline of manufacturing steps of the separator.
Figure 4:
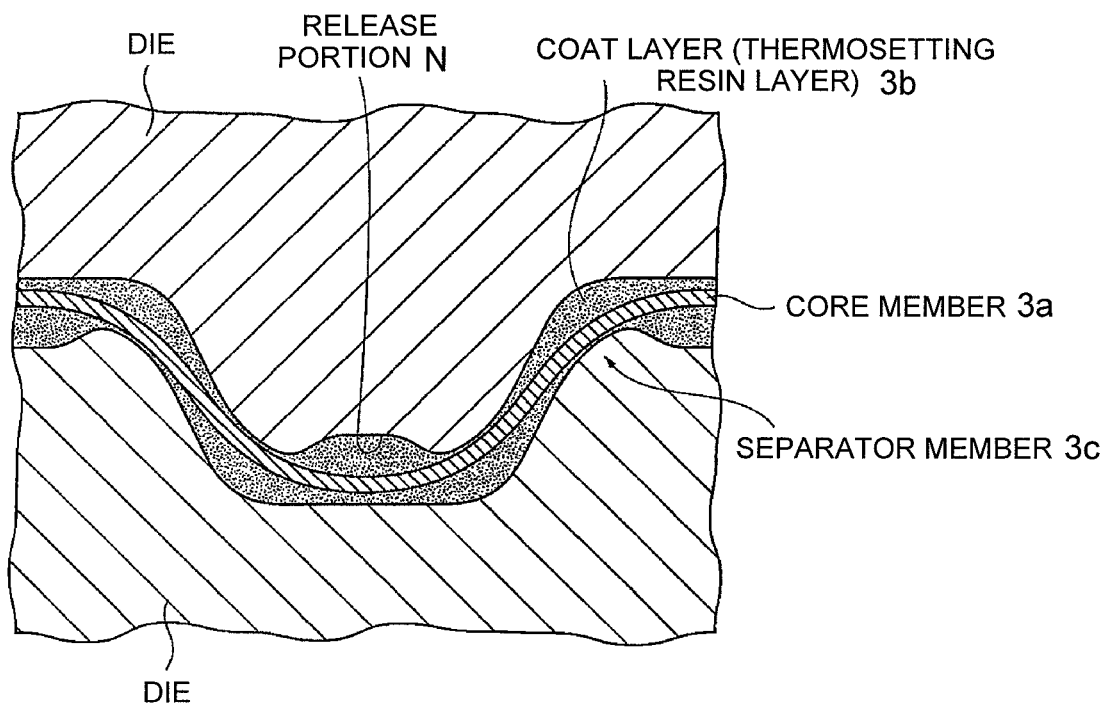
FIG. 4 is an enlarged sectional view of a main part of the separator, the view showing an outline of a hot-press step in manufacturing steps of the separator.

Next, a manufacturing method for the separator 3 is described. FIG. 3 is a view of an outline flow of manufacturing steps for the separator. FIG. 4 is an enlarged sectional view of a main part of the separator, the view showing an outline of a hot-press step in the manufacturing steps.

As shown in FIG. 3, in manufacturing the separator 3, a separator member is prepared (S31: preparation step). In the separator member, the uncured thermosetting resin layers are provided on surfaces of the core member 3a, respectively. Specifically, the separator member is prepared by applying slurry (thermosetting resin layers) in a paste form on both surfaces of metallic foil (for example, a titanium material, a TiC material or a SUS material having a plate thickness of about 50 μm) serving as the core member 3*a* and drying the slurry. The slurry is obtained by kneading carbon powder in thermosetting resin.

In a hot-press step (S32) described later, the thermosetting resin layers are cured and gas flow passages are formed at the same time. Therefore, it is preferred that a thickness of each of the uncured thermosetting resin layers is larger than that of the core member 3*a*. For example, it is preferred that, in the separator member, the thickness of the core member 3*a* be within a range between 40 μm and 70 μm, and the sum total of the thickness of the uncured thermosetting resin layers formed on both surfaces of the core member 3*a* be between 80 μm and 160 μm (the thickness on one surface of the core member 3*a* is, for example, between 40 μm and 80 μm), or within a broader range between 50 μm and 300 μm. In this case, the entire thickness (a plate thickness) of the separator member is, for example, between about 120 μm and 230 μm, or more broadly, between about 120 μm and 670 μm.

Next, for example, the separator member in which the uncured thermosetting resin layers are provided is pressed while being heated (also referred to as warm forming) by using a die (press die) (S32: hot-press step). In the die, a heater (a cartridge heater, a steam heater, an oil heater, and so on) is embedded, and a temperature controller is installed. The temperature controller is able to increase temperature to a level that is necessary to cure the thermosetting resin of (the thermosetting resin layers of) the separator member and maintain substantially constant temperature. Thus, the uncured thermosetting resin layers are cured while the uncured thermosetting resin flows so as to follow deformation of the core member 3*a*. The separator member is formed so as to have a wave shape or an uneven shape (in the sectional view seen from a given direction), and the gas flow passages are thus formed. For example, when the core member 3*a* is made from titanium or SUS, and the thermosetting resin that forms the thermosetting resin layers is phenol resin, the temperature controller maintains heating temperature (curing temperature) for the separator member within a range between 180° C. and 210° C. Thus, it is possible to ensure that warp of the core member 3*a* is restrained. The entire thickness (a plate thickness) of the separator member after the hot-press step (S32) (the formed separator 3) is, for example, about 100 μm.

In the hot-press step (S32), in order to prevent the die from being lifted (or carried up) due to variation in thickness of the separator member (especially the uncured thermosetting resin layers out of the separator member), a release portion N may be set (see FIG. 4). With the release portion N, a part of the thermosetting resin of (the thermosetting resin layers of) the separator member 3*c*, gas generated from the thermosetting resin due to compression in the hot-press step (S32), and so on are allowed to escape (flow). For example, the release portion N may be made of a hollow, a depressed portion, and a groove formed in a surface (a pressing surface) of the die. Thus, even when the thickness of the separator member 3*c* (especially the uncured thermosetting resin layers out of the separator member 3*c*) is non-uniform, it is possible to obtain the separator 3 with a desired plate thickness (an almost uniform plate thickness).

A position where the release portion N is set is not particularly limited (this means that the position may correspond to the vertex or a leg portion of each of the separators 3). However, in consideration of an influence on electric resistance, it is preferred that the release portion N is set in, for example, a portion corresponding to the vertex (the flat portion) of each of the separators 3 as shown in FIG. 4. The number and size (depth, width, and so on) of the release portion N are not limited to those in the example shown in the drawing.

After the hot-press step (S32), die-cutting of unnecessary portions of the separator member is carried out, followed by steps of washing, inspection, and so on. Thus, the separator 3 is obtained.

As described so far, in the embodiment, the coat layers 3*b* (the thermosetting resin layers) of the separator member are cured and the gas flow passages are formed at the same time. Therefore, it is possible to shorten time (steps) required for manufacturing, thus improving productivity of the fuel cell separator 3 effectively. Further, since the same device is used to cure the coat layers 3*b* (the thermosetting resin layers) and form the gas flow passages, it is not necessary to prepare separate devices. This also improves productivity effectively. In particular, since it is assumed that several hundreds of the fuel cell separators 3 are used for one fuel cell stack 10, contribution of the productivity improvement for the fuel cell stack 10 is remarkably large.

In the embodiment, there are also following effects in comparison to the manufacturing methods according to the related arts described in JP 2007-324146 A, JP 2005-317388 A, and so on.

In the method according to the related arts in which coat layers are formed (deposited) on both surfaces of a core member before pressing (for example, see JP 2007-324146 A), the core member extends (by about several tens percent) due to pressing at the time of pressing. However, the coat layers formed on both surfaces of the core member before pressing hardly extend. Therefore, the coat layers can crack and fall off. On the contrary, in the embodiment, the coat layers are formed as the thermosetting resin layers are cured while the separator member is formed (deformed) by warm forming of the thermosetting resin. Therefore, the coat layers are prevented from having cracks and falling off.

Also, for example, compared to the manufacturing method according to the related arts, heating temperature (warm forming temperature) for the hot-press step (S32) is suppressed (for example, between about 180° C. and 210° C.). Therefore, it is possible to restrain warp of the core member 3*a* due to distortion by heating, and time required for warm forming is shortened.

Also, in the hot-press step (S32), the gas flow passages are formed in the separator member while the uncured thermosetting resin is cured. Therefore, curvature of the core member 3*a* is suppressed, and a plate thickness reduction is thus smaller (see FIG. 2 and FIG. 4 in particular). This leads to improvement of formability.

Furthermore, since the uncured thermosetting resin covers the core member 3*a*, there is an advantage that a SUS material and so on are usable even though there are concerns that the SUS material and so on may have metal elution, electric corrosion, pitting corrosion and so on.

The disclosure has been described in detail with reference to the drawings of the embodiment. However, a specific constitution is not limited to that of the embodiment, and design changes and so on within the gist of the disclosure are also included in the disclosure.

What is claimed is:

1. A manufacturing method for a fuel cell separator in which a coat layer made of a thermosetting resin layer is formed and a gas flow passage is provided, the manufacturing method comprising:
   preparing a separator member in which an uncured thermosetting resin layer is provided on a surface of a core member, as a preparation step; and pressing the separator member while heating the separator member so that the gas flow passage is formed in the separator member while the uncured thermosetting resin layer is cured, as a press step, wherein a release portion is provided in a die that is used for the press step, and wherein, in the press step, the uncured thermosetting resin layer is cured and the gas flow passage is formed in the separator member while uncured thermosetting resin is allowed to flow in the release portion.

2. The manufacturing method according to claim 1, wherein the release portion includes at least one of a hollow, a depressed portion, and a groove that are formed in a pressing surface of the die.

3. The manufacturing method according to claim 1, wherein:
the core member is made from titanium or SUS; and
heating temperature for the press step is within a range between 180° C. and 210° C.

4. The manufacturing method according to claim 1, wherein a thickness of the uncured thermosetting resin layer is larger than a thickness of the core member in the separator member.

5. The manufacturing method according to claim 4, wherein:
uncured thermosetting resin layers are formed on both surfaces of the core member;
in the separator member, the thickness of the core member is within a range between 40 μm and 70 μm; and
a total sum of thickness of the uncured thermosetting resin layers formed on both surfaces of the core member is within a range between 50 μm and 300 μm.

* * * * *